(12) United States Patent
Zhang et al.

(10) Patent No.: US 11,582,987 B2
(45) Date of Patent: Feb. 21, 2023

(54) SYSTEMS AND METHODS USING PHYSICAL ENERGY TECHNOLOGY TO PRODUCE NON-DAIRY PROTEIN BASE AND VALUE-ADDED UTILIZATION OF THE CO-PRODUCT

(71) Applicant: WhiteWave Services, Inc., Denver, CO (US)

(72) Inventors: Huimin Krystal Zhang, Arvada, CO (US); Jonathan Arthur Gray, Arvada, CO (US); Luke Michael Chavez, Denver, CO (US); Wendy Kay Behr, Arvada, CO (US)

(73) Assignee: WhiteWave Services, Inc., Denver, CO (US)

( * ) Notice: Subject to any disclaimer, the term of this patent is extended or adjusted under 35 U.S.C. 154(b) by 120 days.

(21) Appl. No.: 16/620,209

(22) PCT Filed: Jun. 5, 2018

(86) PCT No.: PCT/US2018/036051
§ 371 (c)(1),
(2) Date: Dec. 6, 2019

(87) PCT Pub. No.: WO2018/226689
PCT Pub. Date: Dec. 13, 2018

(65) Prior Publication Data
US 2021/0092977 A1    Apr. 1, 2021

Related U.S. Application Data

(63) Continuation-in-part of application No. 15/616,606, filed on Jun. 7, 2017, now abandoned.

(51) Int. Cl.
*A23J 1/14* (2006.01)
*A23J 3/14* (2006.01)
(Continued)

(52) U.S. Cl.
CPC .............. *A23J 1/146* (2013.01); *A23J 3/14* (2013.01); *A23L 5/20* (2016.08); *A23L 5/32* (2016.08);
(Continued)

(58) Field of Classification Search
CPC ... A23J 1/146; A23J 3/14; A23L 33/22; A23L 5/20; A23L 7/115; A23L 29/212; A23L 5/32
(Continued)

(56) References Cited

U.S. PATENT DOCUMENTS 4,084,007 A * 4/1978 Hipp ............... A23L 11/31
426/430
4,394,377 A * 7/1983 Spires ............. A61K 31/35
424/115
(Continued)

FOREIGN PATENT DOCUMENTS

CN         1298649       6/2001
CN       101627813       1/2010
(Continued)

OTHER PUBLICATIONS

Translation of CN-102550794-B (Year: 2013).*
(Continued)

*Primary Examiner* — Brent T O'Hern
(74) *Attorney, Agent, or Firm* — Baker Botts, LLP

(57) ABSTRACT

A method for producing a clean-tasting, neutral-color, concentrated, liquid protein base including separating fibrous material from the protein base. The method further includes applying ultrasonication to the protein base at an ulirasonication unit according to ulirasonication settings. The ultrasonication settmgs are adapted to cause acoustic cavitation within the protein base. The method further includes filtering the protein base through one or more membrane filters after
(Continued)

separating the fibrous material from the protein base. The method further includes processing the protein base to form a protein ingredient in certain cases, the method further includes processing the separated fibrous material to produce a dietary fiber. Processing the fibrous material includes converting gelatinized starch from the separated fibrous material into resistant starch.

18 Claims, 6 Drawing Sheets

(51) Int. Cl.
    *A23L 29/212*     (2016.01)
    *A23L 7/10*     (2016.01)
    *A23L 5/20*     (2016.01)
    *A23L 5/30*     (2016.01)
    *A23L 33/22*     (2016.01)

(52) U.S. Cl.
    CPC .............. *A23L 7/115* (2016.08); *A23L 29/212* (2016.08); *A23L 33/22* (2016.08)

(58) Field of Classification Search
    USPC ......................................................... 426/238
    See application file for complete search history.

(56) References Cited

U.S. PATENT DOCUMENTS

| | | | |
|---|---|---|---|
| 4,624,805 A | 11/1986 | Lawhon | |
| 4,675,194 A | 6/1987 | Gaffney | |
| 5,086,166 A | 2/1992 | Lawhon et al. | |
| 5,270,450 A * | 12/1993 | Westfall | A23J 1/14 530/370 |
| 5,520,935 A | 5/1996 | Eriksen et al. | |
| 7,141,260 B2 | 11/2006 | Cope et al. | |
| 7,186,807 B2 | 3/2007 | Salome et al. | |
| 8,124,162 B2 | 2/2012 | Passe et al. | |
| 8,343,562 B2 * | 1/2013 | Bates | B01D 11/0261 426/238 |
| 8,597,712 B2 | 12/2013 | Hayes et al. | |
| 9,661,870 B2 | 5/2017 | Ding et al. | |
| 10,039,306 B2 | 8/2018 | Vrljic et al. | |
| 2008/0279984 A1 * | 11/2008 | Kalum | A23L 19/14 426/52 |
| 2009/0285935 A1 | 11/2009 | Brophy et al. | |
| 2010/0281765 A1 | 11/2010 | Schwatrz | |
| 2011/0076359 A1 | 3/2011 | Hayes et al. | |
| 2013/0202741 A1 | 8/2013 | Simpson | |
| 2014/0179629 A1 * | 6/2014 | Hamaker | C08L 5/04 514/60 |
| 2014/0242254 A1 | 8/2014 | Neal et al. | |
| 2015/0335043 A1 | 11/2015 | De Jong et al. | |
| 2015/0342224 A1 | 12/2015 | Medoff | |
| 2016/0278402 A1 | 9/2016 | MacKay et al. | |
| 2016/0360770 A1 * | 12/2016 | Sherlock | C07K 1/36 |
| 2017/0042950 A1 | 2/2017 | Lau et al. | |
| 2017/0367373 A1 | 12/2017 | Bleiel et al. | |

FOREIGN PATENT DOCUMENTS

| | | | |
|---|---|---|---|
| CN | 102550794 | | 3/2013 |
| CN | 102550794 B | * | 3/2013 |
| CN | 106260496 A | | 1/2017 |
| EP | 2988619 B1 | | 6/2016 |
| GB | 2496625 | | 5/2013 |
| RU | 2329653 C1 | | 7/2008 |
| WO | 2004/008850 | | 1/2004 |

OTHER PUBLICATIONS

Reinagel, Are Saponins in Quinoa Toxic?—Scientific American; By Nutrition Diva Monica Reinagel on Nov. 5, 2016 (Year: 2016).*
Lopez et al. "Lipoxygenase Inactivation by Manothermosonication: Effects of Sonication Physical Parameters, pH, KCI, Sugars, Glycerol, and Enzyme Concentration". (Year: 1995).*
RU Office Action received for Patent Application No. 2019143674 dated Jun. 2, 2020.
PCT Notification of Transmittal of the International Search Report and the Written Opinion of the International Searching Authority, or the Declaration; International Application No. PCT/US2018/036051; 14 pages; dated Aug. 22, 2018.
Thutiyapom Chittapalo, et al., "Ultrasonic assisted alkali extraction of protein from defatted rice bran and properties of the protein concentrates", International Journal of Food Science and Technology, vol. 44, No. 9, Sep. 1, 2009, pp. 1843-1849, XP055498516.
Vilkhu, et al., "Application and opportunities for ultrasound assisted extration in the food industry—A review", Innovative Food Science and Emerging Technologies, Elsevier, Amsterdam, NL vol. 9, No. 2, Oct. 24, 2007, pp. 161-169.
Cottonseed Hulls NPL, published Feb. 22, 2001, https://web.archive.org/web/20010222180623/http://ww.ingridients101.com/cottonhull.htm (Year: 2001).
Lopez et al. Lipoxygenase inactivation by manothermosonication: effects of sonication physical parameters, pH, KCL, sugars, glycerol, and enzyme concentration, 1995, Journal of Agricultural Food and Chemistry, 43, pp. 620-625 (Year: 1995).
Protein Powder NPL, Oct. 21, 2015, https://web.archive.org/web/20151021145041/http://partyinmyplants.com/plant-based-protein-powder/ (Year: 2015).
Saponin NPL, Nov. 5, 2016, https://www.scientificamerican.com/article/are-saponins-in-quinoa-toxic/ (Year: 2016).
Snyder NPL, published May 3, 2017, https://web.archive.org/web/20170503044838/https://snyderfiltration.com/learning-center/articles/introduction-to-membranes/pressure-driven-membrane-filtration-processes/ (Year: 2017).
CN102550794B translation, originally published Mar. 6, 2013 (Year: 2013).
RU Office Action received for Patent Application No. 2019143674 dated Aug. 10, 2021.
RU Office Action received for Patent Application No. 2019143674 dated Mar. 25, 2021.
RU Search Report for Patent Application No. 2019143674 dated Mar. 25, 2021.

\* cited by examiner

SYSTEMS AND METHODS USING PHYSICAL ENERGY TECHNOLOGY TO PRODUCE NON-DAIRY PROTEIN BASE AND VALUE-ADDED UTILIZATION OF THE CO-PRODUCT

PRIORITY

This nonprovisional application is a U.S. National Stage Filing under 35 U.S.C. § 371 of International Patent Application Serial No. PCT/US2018/036051 filed Jun. 5, 2018 and entitled "Systems and Methods Using Physical Energy Technology to Produce Non-Dairy Protein Base and Value Added Utilization of the Co-Product" which is a Continuation-in-Part of U.S. application Ser. No. 15/616,606 filed Jun. 7, 2017, both of which are hereby incorporated by reference in their entirety.

TECHNICAL FIELD

Certain embodiments of the disclosure relate generally to the field of food processing and more specifically to physical energy processes including ultrasound cavitation and membrane filtration to produce a protein concentrated liquid and/or dry powder protein. In addition, certain embodiments of the disclosure relate more specifically of processing the co-product (or by-product) of the protein base production into high dietary fiber food products.

BACKGROUND

Protein is a macronutrient used by the body for building, repairing, and maintaining tissues and for making hormones. As a result, consuming an adequate amount of protein is important to a healthy diet. Protein can be found in a variety of food sources, including animal sources (e.g., eggs, milk, meat, poultry, and fish), plant sources (e.g., legumes, nuts, seeds, grains, etc.), algae sources, and fungal sources (e.g., myco-protein). Protein obtained from a protein source can be used as an ingredient in a food product. However, incorporating added protein into a food product can present challenges in terms of color, flavor, taste, solubility, and viscosity. Furthermore, extracting and producing protein products produces by-products which are unsustainably discarded.

SUMMARY

Particular embodiments described herein include a method comprising separating insoluble fibrous materials such as crude fiber and insoluble starch from a protein base. The method further comprises applying ultrasonication to the protein base at an ultrasonication unit according tee ultrasonication settings. The ultrasonication settings are adapted to cause acoustic cavitation within the protein base. The method further includes filtering the protein base through one or more membrane filters after separating the fibrous material from the protein base. The method further includes processing the protein base to form a protein ingredient.

Particular embodiments described herein include an apparatus including a dehuller, one or more grinders, a container—preferably a batch container, a separator, an ultrasonicator, a membrane filtering apparatus, and a spray dryer. The dehuller dehulls a protein base ingredient, and the one or more grinders grind the protein base ingredient. The process steps of dehulling and grinding the protein base ingredient could also be done in a continuous extraction system. The container holds a protein base that includes the ground and dehulled protein base ingredient (i.e., raw material) which is mixed with water at a 1 to 5 weight ratio to a 1 to 20 weight ratio, preferably in the form of a slurry. The separator receives the protein base from the container and removes fibrous material from the protein base, thus providing a slurry comprising protein. The ultrasonicator includes one or more sonication elements. The ultrasonicator causes cavitation in the protein base. The membrane filtering apparatus includes one or more membrane filters. The membrane filtering apparatus filters the protein base through one or more membrane filters. The spray dryer dries the filtered protein base.

Certain embodiments of the present disclosure may provide one or more technical advantages. As an example, technical advantages of certain embodiments allow for extracting and removing undesirable color compounds from a protein base, decreasing simple compounds that may impart undesirable flavor and taste to the protein base or food products made from the protein base, and/or improving texture such as achieving lower particle size and viscosity for the protein base, Accordingly, certain embodiments allow for color, taste/flavor, texture, and/or viscosity to be improved to an extent that would not be possible using known processing techniques. As another example, a technical advantage of certain embodiments uses environmentally friendly/green technology rather than existing chemical wet method approaches. As yet another example, a technical advantage of certain embodiments is the use of co-products to produce puffed snacks or fermented foods with high dietary fiber content, In addition, a technical advantage of certain embodiments improves protein extractability and solubility. Moreover, certain embodiments may assist in inactivating critical enzymes (such as lipoxygenase, LOX) at temperatures less than approximately 85° C., which may indirectly improve protein solubility. Certain embodiments may include all, some, or none of these advantages. Other advantages may be apparent to a person of ordinary skill in the art.

BRIEF DESCRIPTION OF THE DRAWINGS

For a more complete understanding and its advantages, reference is now made to the following description, taken in conjunction with the accompanying drawings, in which.

DETAILED DESCRIPTION

Figure 1:
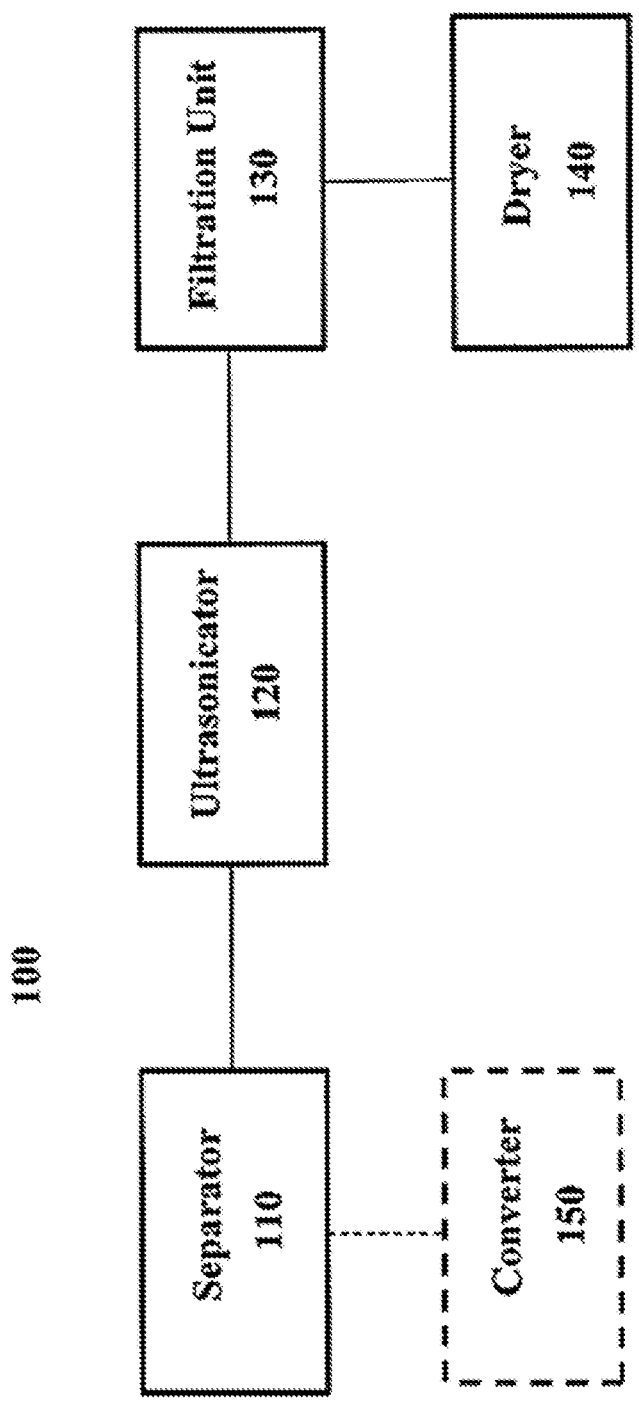
FIG. 1 illustrates an example system for producing a concentrated protein base, according to certain embodiments.

As discussed above, protein obtained from a protein source can be used as an ingredient in a food product, for example, to impart nutrition to the food product. However, known protein-based ingredients may present challenges in terms of color, flavor, taste, solubility, and particle size. Embodiments of the present disclosure may improve one or more of these characteristics. For example, certain embodiments use physical energy technology, ultrasonication cavitation, and membrane filtration processes to produce clean-tasting, neutral-color, concentrated, liquid protein base.

In certain embodiments, at certain amplitudes and power, the physical energy technology may cause cavitation, which is a phenomenon of the generation, expansion, and eventual. collapse of bubbles within a fluid. As ultrasound waves propagate in a fluid, generated bubbles oscillate and collapse, which causes thermal, mechanical, and chemical effects. Cavitation may exert mechanical forces such as pressure, turbulence, shear stresses within the liquid. Cavitation may also facilitate chemical effects such as hydrolysis that creates H+ and OH– free radicals, which assist, in enzymatic and microbial inactivation. The physical energy technology may be provided at particular frequencies and power in order to cause cavitation with particular properties to process a fluid. As a result, the physical energy technology causing cavitation can be used for removing/extracting color, assisting in the inactivation of microorganisms and enzymes such as lipooxygenase (LOX) that cause beany/grassy off-flavor, increasing protein extractability, and dispersing and de-foaming, etc.

In certain embodiments, membrane filtration technology is applied to concentrate desirable protein products and remove undesirable simple compounds. Membrane filtration technology uses one or more porous membrane filters to separate particles in a fluid. Particles may be separated on the basis of their size and shape with the application of a pressure differential across the membrane. Specially designed membranes with different pore sizes may be used to target the separation of different particles. Additionally, pressure and temperature may be adjusted within or near the membrane filters to facilitate the separation of target particles. Membrane separation provides several advantages over the conventional separation processes, including lower separation temperature, higher separation rates, lower energy use, greater flexibility, and environmental sustainability.

Important techniques of membrane separation include ultrafiltration (UF), microfiltration (MF), and nanofiltration (NF), and reverse osmosis (RO) separation processes. These processes differ based on membrane characteristics, pore size, and operating pressures. Microfiltration (MF) is a pressure-driven, membrane-based process used to concentrate particles in the 0.1 to 10 μm size range and to separate them from the suspending liquid. MF may separate macromolecules such as starch from a liquid based food matrix as further described later. For example, the residual starch in the liquid stream may be further separated out using the microfiltration process to produce a liquid stream of isolated protein. Ultrafiltration (LTF) may be used to decrease contents of simple compounds that cause undesirable sensory and nutritional properties in addition to concentrating protein content to a certain degree. Those simple compounds may include saponins (that may cause bitterness and foaming), free pigments such as xanthophyll and chlorophyll, as well as Maillard Browning by-products, tannins (that may cause astringency), sugars, and phytate (an antinutritional factor), etc. In addition, removing phytate from a plant protein using UF may also indirectly improve the solubility of protein based products.

Wide pore ultrafiltration may also fractionate non-dairy proteins and may be applied to selectively produce particular protein fractions depending on the desired use. For example, certain non-dairy proteins may be filtered using wide pore UF to produce protein fractions with a high Protein Digestibility Corrected Amino Acid Score (PDCAAS) value. Using pea protein as an example, the three major pea protein are legurnin (5.9-24.5%), vicilin (26.3-52.0%), and convicilin (3.9-8.3%), the ratio of vicilin to legumin varies among varieties and may range from 0.5 to 1.7. The 11S legumin protein component contains more sulfur-containing amino acids, and has a higher denaturation temperature (Td>90° C.) than the 7S vicilin component (Td 71.7~82.7° C.). Applying wide pore UF to a base with pea proteins may produce a legumin rich protein fraction that may be suitable for manufacturing plant-based milk with a higher PDCAAS value and an increased heat resistance. Meanwhile, wide pore UF may be used to separate out the legumin and convicilin components, producing a protein fraction having a high percentage of the vicilin component. In some embodiments, the resulting pea protein base comprises enriched higher proportion of vicilin proteins after wide pore UF. Vicilin pea protein fraction is better at gelling than legumin component, while convicilin hinders gel formation, thus the resulting protein fraction may be utilized for its gelling capacity to make food like high protein plant-based yogurt product.

Sodium dodecyl sulfate polyacrylamide gel electrophoresis (SDS-PAGE) may be used to determine and confirm the effectiveness of the fractionation and resulting composition after the filtration process. Additionally, SDS-PAGE may also be used to select specific suitable variety of raw material. For example, SDS PAGE may screen a plurality of pea varieties to select high vicillin percentage pea variety as raw material for creating a protein product for a yogurt product.

In addition to removing undesirable compounds and particles, membrane filtration may also increase the portion of the resulting product composed of protein. For example, Ultrafiltration may be used to concentrate the protein content. For example, an initial protein liquid stream with 2% protein processed using UF may result in an end protein content of 6% with a three volume concentration factor (VCF) or 15% with a 7.5 or more volume concentration factor. UF, NF or RO may further increase the concentration of the protein in the protein base, for example, until reaching the gelling concentration (Cg). For example, one or more of NF or RO may be applied to the protein liquid stream retentate after UE to further increase the concentration of protein to up to 25%. Ultimately, the combination. of the ultrasound cavitation and membrane filtration processes makes it possible to produce a clean-tasting, neutral-color, concentrated, liquid non-dairy protein base that can be incorporated into a food product, Nanofiltration (NF) may be used to further concentrate the protein content and/or remove monovalent ions such as salts. Additionally, NF may be used to recover prebiotics oligosaccharides, e.g., raffinose, stchyose, and verbscose, from the UF permeate waste stream. Prior to NF, the color and other simple compounds in the UF permeate may be removed by activated carbon absorption. in certain embodiments, NF may occur with the use of exchange resin (also referred to as ion-exchange resin or polymer) to recover color compounds, such as xanthophyll including lutein and chlorophyll, for use as commercial ingredient products.

Filtering and processing to produce the protein product creates a number of by-products and/or co-products. In order to sustainably produce the various protein products, utilization of those co-products is also contemplated by this disclosure. One such co-product is fibrous material, e.g., Okara, pulp, etc., separated from the protein base. Conventionally, the fibrous material has been merely discarded, which not only creates wastes but also consumes additional resources for its disposal. In certain embodiments, fibrous material separated from the protein liquid stream may be further processed to create a dietary fiber. For example, gelatinized starch in the fibrous material may be converted into resistant starch to form dietary fiber. The dietary fiber may then be used to produce a variety of healthy food products high in fiber, e.g., high-fiber puff snacks or fermented food products. In this manner, this disclosure contemplates sustainably producing a non-dairy protein base in a sustainable manner by utilizing co-products to produce dietary fiber.

Figure 2:
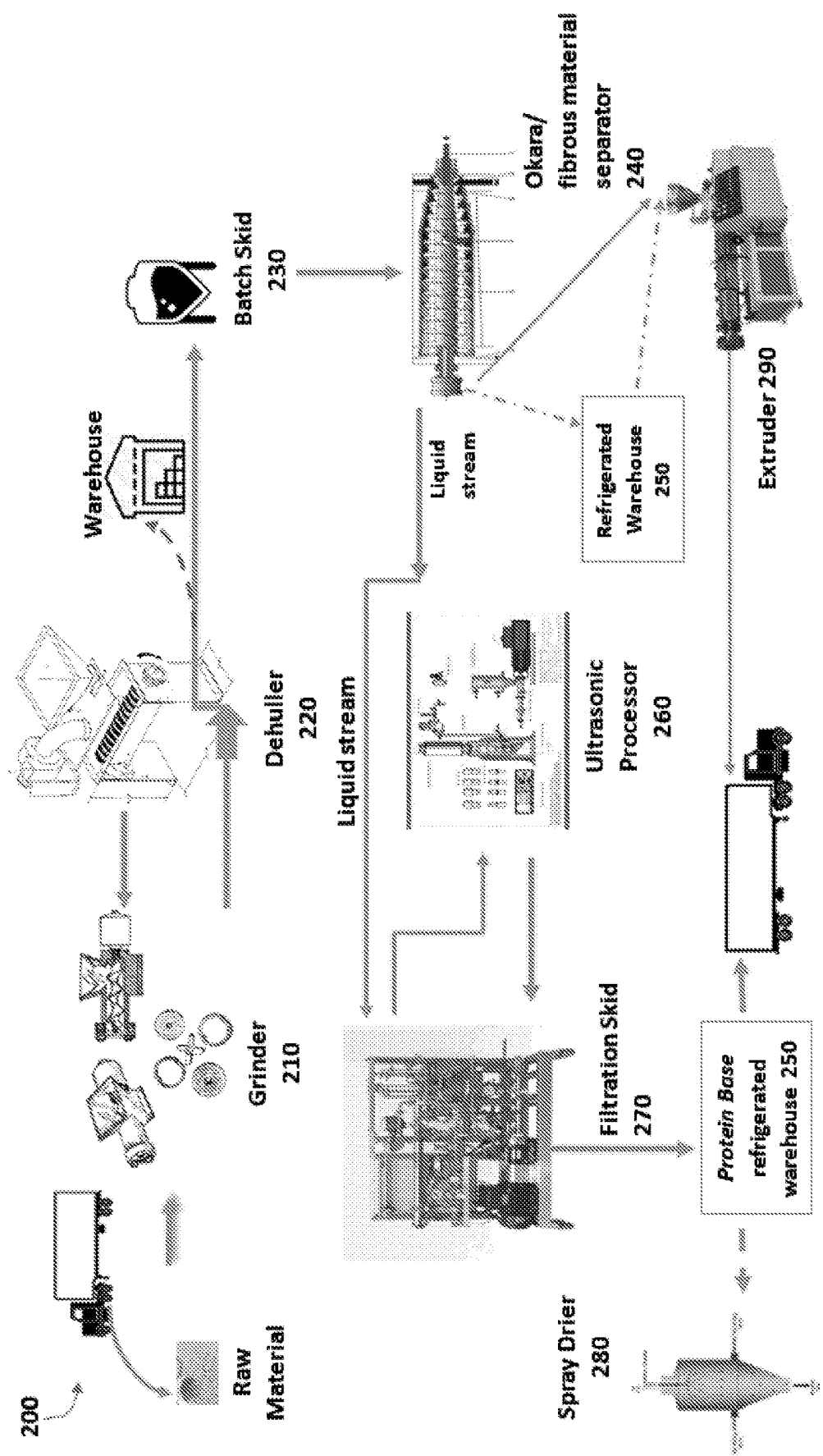
FIG. 2 illustrates another example system for producing a concentrated protein base, according to certain embodiments.
Figure 3:
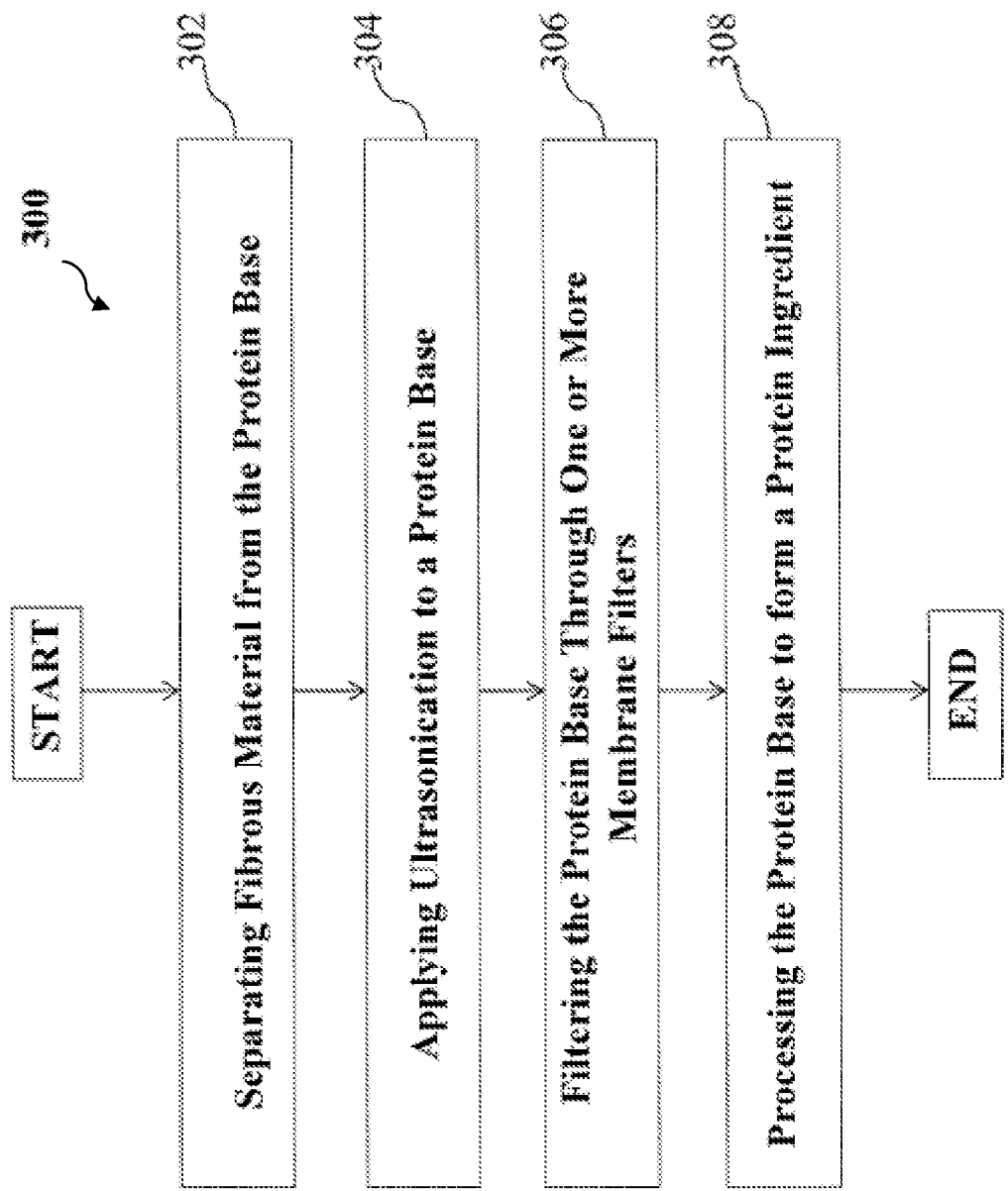
FIG. 3 is a flowchart diagram illustrating an example method of producing a concentrated protein base, according to certain embodiments.
Figure 4:
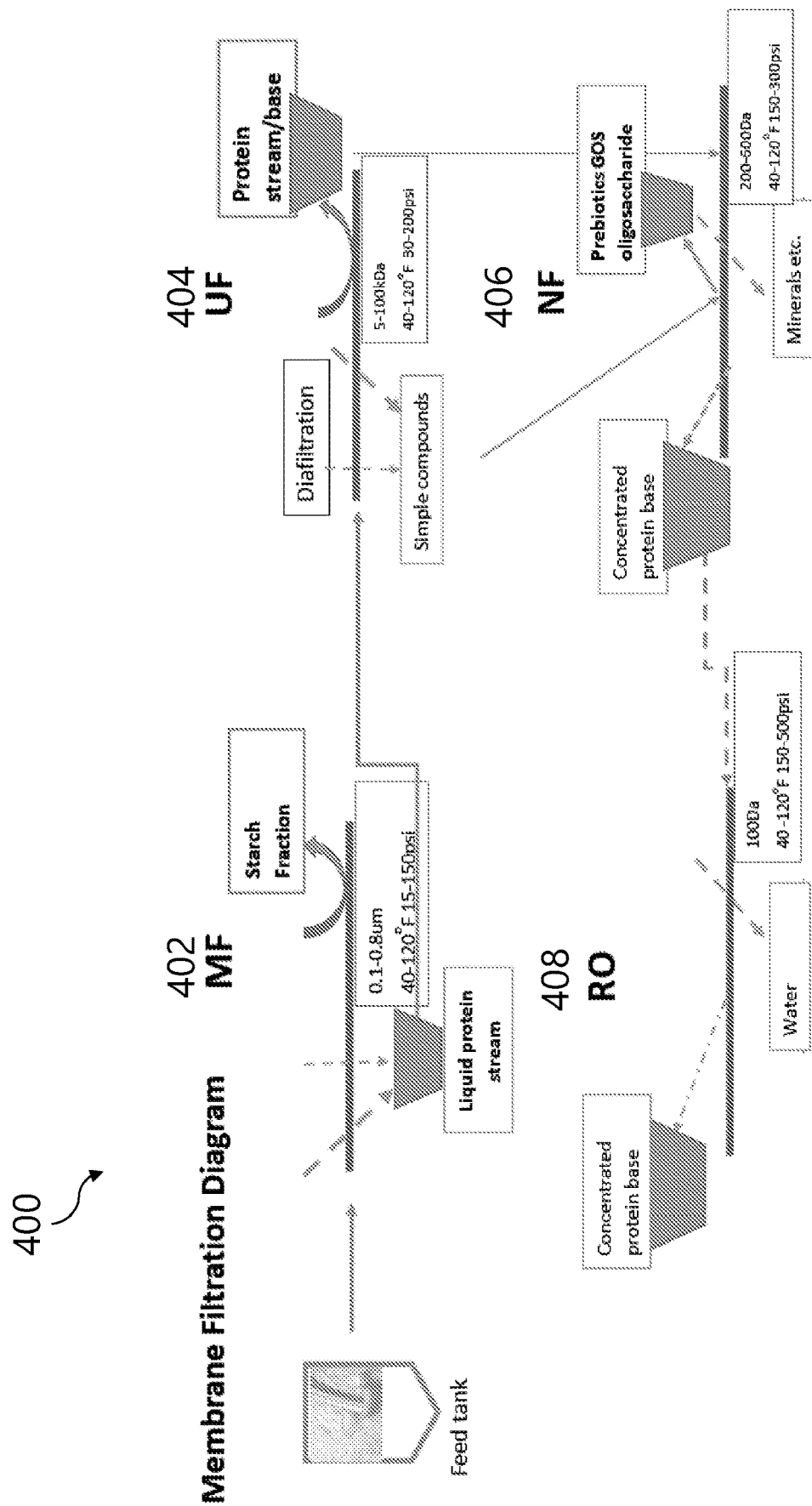
FIG. 4 is a flowchart diagram illustrating an example method of filtering a protein base, according to certain embodiments.

Methods and systems addressing these problems will be described in more detail using FIGS. 1 through 4. FIG. 1 illustrates an example system for producing a concentrated protein base, according to certain embodiments. FIG. 2 illustrates another example system for producing a concentrated protein base, according to certain embodiments. FIG. 3 is a flowchart diagram illustrating an example method of producing a concentrated protein base according to certain embodiments. FIG. 4 is a flowchart diagram illustrating an example method of filtering a protein base, according to certain embodiments. Embodiments of the present invention and its advantages are best understood by referring to FIGS. 1 through 4 of the drawings, like numerals being used for like and corresponding parts of the various drawings.

FIG. 1 illustrates an example system 100 for producing a concentrated protein base, according to certain embodiments. System 100 includes a separator 110, ultrasonicator 120, filtration unit 130, and dryer 140. Before producing the protein ingredient using system 100, raw materials may be pretreated, or pre-processed, before being introduced to ultrasonicator 110. As a specific example, a pea product may be processed before being used to produce a protein ingredient. The pea product may be dehulled and ground into a whole grain meal/powder. The pea material/powder may be mixed with water, e.g., at 1:5 to 1:20 weight ratio, and then optionally heated to a mild temperature to hydrate the pea materials and to loosen the hydrogen bond to increase protein extraction.

Separator 110 may receive the protein base and separate components of the protein base before the protein base is filtered in filtration unit 130. In certain embodiments, separator is configured to separate fibrous material from the protein base before ultrasonication. For example, Okara, pea pulp, may be separated from the protein base. Separating such materials from the protein base may aid in the filtration of the protein base by preventing fibrous materials from passing over the membrane filters, which limits the clogging and lowers the necessary pressure to be applied. Additionally, removing starch and other non-protein components may increase the resulting protein concentration in the concentrated protein base.

Ultrasonicator 120 may apply ultrasonication to a protein base. Ultrasonicator 120 may be controlled using settings or parameters, which may affect the thermal, mechanical, and chemical effects of the ultrasonication in the protein base. For example, ultrasonicator 120 may be set to operate at a particular amplitude, flow rate, power density, and/or for a certain duration. In certain embodiments, various settings of ultrasonicator 120 may be predetermined based on the type or composition of the protein base or on the desired protein ingredient. In certain embodiments, the ultrasonication settings are adapted to cause acoustic cavitation within the protein base. As discussed above, cavitation. may aid in producing an improved protein ingredient by removing/extracting color, assisting in the inactivation of microorganisms and enzymes such as lipooxygenase (LOX) that cause beany/grassy off flavor, increasing protein extractability, decreasing viscosity and particle size, and dispersing and de-foaming. For example, the LOX inactivation resulting from sonication at temperatures lower than 85 degrees Celsius may occur due to the physical effects (cavitation and other mechanical effects), chemical effects (such as free radical formation), and localized heat.

In certain embodiments, the ultrasonication applied by ultrasonicator 120 is manosonication. In some embodiments, the manosonication is applied at a pressure between 1 and 4 bars. The application of pressure during ultrasonication may enhance the removal of undesirable compounds and the concentration of the protein in further processes.

Filtration unit 130 includes one or more membrane filters. Filtration unit 130 may be configured to use the one or more membrane filters to filter the protein base. In certain embodiments, filtration unit comprises one or more of a UF membrane filter, a MF membrane filter, and a RO or NF membrane filter. As described above, each type of membrane filter may serve a different purpose. Filtration unit 130 may be adapted depending on the desired protein product, including the concentration and physical characteristics, and/or on the protein base received at filtration unit 130. For example, filtration unit 130 may only comprise certain types of filters or apply different temperatures and/or pressures during the filtration of the protein base. Examples of various conditions are discussed in reference to FIG. 4 below.

In certain embodiments, filtration unit 130 is adapted to filter the protein base through various types of membrane filters in a particular order. For example, filtration unit 130 may be configured such that the protein base is first filtered through a UF membrane filter and then through a RO or NF membrane filter. In particular embodiments, filtration unit 130 may be configured to filter the protein base through an MF membrane filter between filtering through a UF membrane filter and a RO or NF membrane filter. In certain embodiments, the water recovered from RO may be re-used for initial batching in system 100. In particular embodiments, filtration unit 130 may comprise one or more of each of a UF membrane filter, MF membrane filter, and an RO or NF membrane filter. For example, filtration unit 130 may comprise a plurality of UF, MF, RO, or NF membrane filters in series or parallel.

The protein base exiting filtration unit 130 may have a higher concentration of protein then before being filtered in filtration unit 130. For example, the protein concentration may be increased from 2% up to 25% in filtration unit 130. Although an increased protein concentration may be obtained through filtration, to produce the protein ingredient, further concentration may be required. One way to further concentrate the protein is to dry the protein base. In certain embodiments, system 100 includes dryer 140, which is configured to dry the protein base. Dryer 140 may use any suitable means to further concentrate protein in the protein base, including removing water and other components of the protein base, leaving behind the targeted protein. For example, dryer 140 may comprise a spray dryer which sprays protein base in a chamber, allowing water in the protein base to evaporate. By removing water, the protein concentration may be increased, and a protein ingredient may be produced. In some embodiments, the water from the NF waste stream may be reused in subsequent batches for forming the protein ingredient. Other methods of drying used to dry a solution or slurry are also contemplated within this disclosure.

In certain embodiments, system 100 also includes an optional converter 150. Fibrous material separated from the protein base in separator 120 may be received by converter 150. Converter 150 may be configured to convert starch in the fibrous material from a gelatinized starch into a resistant starch. In this manner, system 100 may use a co-product from producing the protein ingredient to produce a dietary fiber, which may be incorporated in other food products.

In certain embodiments, converter 150 may be configured to subject the fibrous material to a temperature exceeding the starch gelatinization temperature or the ultra-heat treatment (UHT) temperature to increase gelatinization of the starch in the fibrous material. For example, in pea protein, the separated fibrous material may be subject to the starch gelatinization temperature of 70 degrees Celsius. As another example, the separated fibrous material from a pea protein may be subjected to the ultra-heat treatment temperature of 140 degrees Celsius. By increasing the gelatinization of the fibrous material, more starch may be retrograded to produce dietary fiber.

Gelatinized starch in fibrous material, e.g. okara, pulp, etc., may become retrograded when cold stored. For example, the fibrous material may be cold stored at a temperature at or below 4 degrees Celsius for at least 24 hours to induce retrogradation. Starch retrogradation may increase the nutritional value of the fibrous material, due to the slower enzymatic digestion of retrograded starch and moderated release of glucose into the blood stream in response to the retrograded starch relative to gelatinized starch. Retrograded starch may also be considered dietary fiber as defined by the FDA guidance, such as in the November 2016 FDA guidance.

The digestibility of retrograded starch is largely related to the extent of gelatinization and subsequent time and temperature of storage as well as temperature cycle. Fibrous material from byproduct from certain protein sources, such as a plant protein base, may have a high native dietary fiber content including gelatinized starch, as well as residual protein, lipid, and other nutrients. For example, native pea roughly contains 12% crude fiber and 18~40% starch, oat roughly consists of 59% starch and 13% dietary fiber. In conventional protein production from non-animal sources, this fibrous material is discarded and poses a significant food waste and disposal problem. In certain embodiments, converter 150 of system 100 may utilize the high intrinsic fiber and gelatinized starch to produce dietary fiber through converting the gelatinized starch into to resistant starch, e.g., dietary fiber.

Converter 150 may increase the retrogradation degree of the gelatinized starch from the fibrous material and convert it into high resistant starch or dietary fiber ingredient, In certain embodiments, converter 150 is configured to store the fibrous material at cold temperatures and cycling the storing temperatures in order to increase the retrogradation rate. The resulting converted fibrous material consists of high content of dietary fiber from both intrinsic and normal converted starch sources, which may be used to produce high dietary fiber puffed snack foods and fermented food products.

In certain embodiments, the created protein ingredient may be used as an added source of protein for a variety of products. For example, the protein ingredient may be used in a food products such as dairy or non-dairy (plant-based) beverages (ESL, RTD etc.), frozen desserts and novelties (ice cream etc.), yogurts, cheeses, coffee creamers, sport drinks, enhanced fruit and vegetable juices, smoothies, snack fbods, bakery products (breads, cookies, crackers etc,), nutritional RTM powder products, sport/nutritional bars, nutritional tea, nutritional coffee, meats and/or analogs, spreads (nut-based, dairy or non-dairy based butters or analogs), whipped toppings, and exotic foods (dumplings, steam breads, steam buns, tofu etc.).

FIG. 2 illustrates another example system 200 for producing a concentrated protein base, according to certain embodiments. System 200 includes grinders 210 (coarse and fine grinder), dehuller 220, batch skid 230, okara separator 240, refrigerated warehouse 250, ultrasonicator 260, membrane filtration apparatus 270, spray drier 280, extruder 290. System 200 may begin with raw non-dairy material and process the raw material to produce a concentrated protein base.

Grinders 210 and dehuller 220 may convert the raw material into a finely ground powder. Grinders 210 may be configured to coarsely grind the raw materials. Dehuller 220 may receive the coarsely ground raw material and dehull the raw material. Grinders 210 may then finely grind the raw materials to produce the finely ground powder. The raw materials may be coarsely ground, dehulled, and fine grounded into fine powder using the grinders 210 and dehuller 220; firstly coarse grinding, followed by dehulling, finally fine grinding. The finely ground powder may be mixed with water, e.g. at 1:5 to 1:20 weight ratio in batch container 230. The mixed powder and water may be allowed to sit in batch container 230 to soften the structure of the mixed ingredients and loosen the hydrogen bond between starch and protein, thereby increasing protein extraction yield. In some embodiments, the system may be configured for pre-gelatinizing starch at mild temperatures. For example, batch container 230 may be configured to subject the mixture to temperatures in the range of 120 to 160° F.

Separator 240 may receive the slurry from the batch container 230 and separate fibrous material, also referred to as okara, that mainly consists of crude fibrous materials such as lignin, cellulose, hemi-cellulose and starch that may be used to create dietary fiber. In certain embodiments, separator 240 is configured to separate the fibrous material. For example separator 240 may include a sieve mesh to separate as much fibrous material as possible. Separating such materials from the protein base may aid in the membrane filtration of the protein base by preventing fibrous materials from passing over the membrane filters, which limits the clogging and lowers the necessary pressure to be applied. Also, separating out as much as starch from the protein liquid stream may aid in higher protein concentration in the protein base.

In certain embodiments, separator 240 includes a ultra-high pasteurization (UHT) function, which prolongs the liquid stream shelf life and gelatinizes starch in the liquid stream and fibrous material. For example, separator 240 may be configured to subject the liquid stream and fibrous material to temperatures above 140 degrees Celsius.

The liquid stream and okara may be refrigerated in cold warehouse 250 for short time (preferably 1-5 days) so that the native starch may be settled and the gelatinized starch may be retrograded, respectively. The resulting retrograded resistant starch turns into a part of dietary fiber. The liquid stream consists of protein, residual retrograded starch, and simple compounds. In some embodiments, the liquid stream may be MF to completely remove the starch. The residual retrograded starch in the liquid stream may gel out and be separated out further using the microfiltration process with the membrane filtration apparatus 270. Afterwards, ultrasonicator 260 may apply ultrasonication to the protein predominant liquid stream.

Ultrasonicator 260 may be controlled using settings or parameters, which may affect the thermal, mechanical, and chemical effects of the ultrasonication in the protein base. For example, tittrasonicator 260 may be set to operate at a particular amplitude, flow rate, power density, and/or for a certain duration. In certain embodiments, various settings of ultrasonicator 260 may be predetermined based on the type or composition of the protein base or on the desired protein. ingredient. In certain embodiments, the ultrasonication settings are adapted to cause acoustic cavitation within the protein base to extract color compounds and other undesirable simple compounds, increase protein extractability, decrease viscosity, disperse and de-foam, as well as wet-mill the protein base to finer particle size.

In certain embodiments, the ultrasonication settings comprise one or more of an amplitude, a frequency, a power, and a duration. For example, in some embodiments, the ultrasonication setting includes an amplitude between 25 and 100 micrometers. In certain embodiments, the ultrasonication is applied at a frequency in the range of 20 Hz to 20 kHz. In some embodiments, the intrasonication is applied at a frequency around 200 Hz, e.g., in the range of 180 to 220 Hz. In some embodiments, the ultrasonication applied at a power in the range from 100 to 400 W. In some embodiments, the ultrasonication is applied for a particular duration, such as for 15 minutes or longer. This disclosure contemplates any number of ultrasonication settings that may be applied individually or in combination with one another. The ultrasonication settings may be adapted based on a variety of factors such as batch size, protein base, desired viscosity, flavor, neutral color, etc.

Membrane Filtration Apparatus 270 includes one or more membrane filters to filter the protein base. In certain embodiments, filtration unit comprises one or more of a UF membrane filter, a MF membrane filter, and a RO or NF membrane filter. As described above, each type of membrane filter may serve a different purpose. Membrane Filtration Apparatus 270 may be adapted depending on the desired protein product, including the concentration and physical characteristics, and/or on the protein base received at Membrane Filtration Apparatus 270. For example, Membrane Filtration Apparatus 270 may only comprise certain types of filters or apply different temperatures (40° F.-120° F.) and/or pressures (10-600 psi) during the filtration of the protein base. Filtration system may comprise a plurality of UF, MF, RO, or NF membrane filters in series or parallel.

FIG. 3 illustrates an example method of producing a protein ingredient, according to some embodiments. Prior to the start of method 300, a protein base may be produced. The protein base of the invention is preferably an aqueous suspension or slurry comprising a non-animal protein source. It is particularly preferred that said protein base does not contain or is substantially free from animal and/or dairy matter.

In embodiments of the invention, said non-animal protein source is preferably selected form the group consisting of plant, algae, fungus, or combinations thereof. As used herein the term "plant" shall be taken to mean a plant or part thereof including but not limited to fruit and/or vegetable matter. Any suitable edible plant substance known in the art may be used, preferably selected from the group consisting of legumes, nuts, seeds, grain and combinations thereof. In one embodiment, said legumes are selected from the group consisting of soy, pea, peanuts, lentils, beans, hemp and combinations thereof. It is particularly preferred that the none animal protein source comprises legumes selected from the group consisting of green pea, yellow pea, snow pea, snap peas, chickpea, mung bean, black-eyed peas, and combinations thereof.

In a further embodiment, said nuts are selected from the group consisting of almonds, cashews, pecans, macadamias, hazelnuts or walnuts and combinations thereof.

In a further embodiment, said seeds are selected from the group consisting of hemp, pumpkin, quinoa, lupines, sesame, pumpkin, tiger nut, flax, chia, sunflower, coconut, and combinations thereof.

In a further embodiment, said grains are selected from the group consisting of wheat, rye, spelt, rice, barley, oat, and combinations thereof.

It is particularly preferred that said protein base comprises between 1 to 5 weight ratio to a 1 to 20 weight ratio of non-animal protein source to water. Methods for the preparation of such suspensions or slurries are known in the art and typically comprise mechanical disruption of the plant matter and hydration and/or combination with a solution followed by separation of the protein base from starchy and/or fibrous matter, e.g., by centrifugation or filtration. For example, a non-animal protein source may be milled, ground, soaked, dehulled, mixed with water, heat treated, etc. in order to produce a suitable protein base. In certain embodiments, the protein base is sourced from a legume, nut, seed, grain, plant, algae, fungus, or combinations thereof.

Method 300 may start at step 302 using a protein base in a liquid stream. At step 204, fibrous material is separated from the protein base. In particular embodiments, separation equipment different from ultrasonicator 120 and filtration unit 130 is used to separate the fibrous material. Alternatively, the fibrous material is separated using components of the ultrasonication source or filtration apparatus. Fibrous material may hinder the filtration of the protein base, and is typically removed from the protein base prior to filtration. Instead of merely discarding the fibrous material, the separated fibrous material may be further processed to produce dietary fiber. The fibrous material may be separated by targeting the particular fibrous material to remove from the protein base, or alternatively, the fibrous material may be separated from the protein base along other material and then isolated from the additional removed components of the protein base.

At step 304, ultrasonication is applied to a protein base at an ultrasonication unit such as ultrasonicator 120. As discussed above, a number of ultrasonication settings may be adjusted in order to optimize the ultrasonication for particular uses. For example, particular amplitudes, frequencies, power densities, durations, etc. may be adjusted based on protein base or desired protein ingredient. In certain embodiments, the ultrasonication may occur continuously over the duration of ultrasonication. Alternatively, ultrasonication may occur in stages, wherein certain settings are adjusted between settings. For example, particular ultrasonication may be optimized to target particular enzymatic or microbial processes or the removal of molecules causing undesirable colors or flavors.

in certain embodiments, ultrasonication may be applied until the protein base has a certain neutral color. Lab color space is a color-opponent space with dimensions L for lightness and a and b for color-opponent dimensions, based on nonlinearly compressed components. Neutral colors may be defined as those colors having low a* and b* values, e.g., the absolute values of those dimensions close to zero. As described above, ultrasonication may facilitate the suppression of molecules which provide the protein base with certain colors. As an example, using L*a*b* color space as a reference, ultrasonication may be applied until the protein base has b* value less than +15 or similar to dairy milk value. Furthermore, ultrasonication may be applied such that the L* value is also changed. The effect on ultrasonication may be controlled by adjusting settings of the ultrasonication source, e.g., ultrasonicator 110.

Ultrasonication may also reduce the particle size of the protein base. Reduction of the average particle size of the protein base may allow for efficient separation and filtering of the protein base in further steps. In this manner, ultrasonication not only removes undesirable molecular components of the protein base, but also processes the protein base to facilitate further processing downstream.

Ultrasonication may serve the further purpose of deactivating particular enzymatic processes which may negatively impact the resulting protein ingredient. For example, certain enzymes in plant, fungal, and animal products, may catalyze the dioxygenation of polyunsaturated fatty acids in lipids. These enzymatic processes may produce chemical reactions resulting in the protein base acquiring off-flavors. For example, lipoxygenase may produce a beany off-flavor (hexanal is one of the markers) if activated in the protein base. In certain embodiments, the protein base comprises lipoxygenase that is activated and the ultrasonication applied at least until the lipoxygenase is inactivated at temperatures below 85 degrees Celsius, In this manner, certain enzymatic or microbial processes may be suppressed, resulting in a superior protein ingredient.

At step 306, the protein base is filtered through one or more membrane filters. In some embodiments, the protein base is filtered after fibrous material is separated from the protein base. Different membrane filtration techniques, as described above, may be used to filter the protein base. For example, one or more membrane filters may include one or more of a UF, MF, NF, or RO membrane filter.

In certain embodiments, the protein base is filtered through an ultrafiltration membrane having a maximum pore diameter between 0.1 and 0.001 microns. In particular embodiments, filtering the protein base with a ultrafiltration membrane includes filtering the protein base until the protein base comprises less than 0.5 g/kg of saponins, less than 0.5% tannins, and less than 1.5 g/kg phytate. The reduction of saponins, xanthophyll, tannins, and phytate may improve the flavor and increase the stability of the protein ingredient.

In certain embodiments, the protein base is filtered through a nanofiltration membrane or reverse osmosis membrane having a maximum pore diameter between 1 and 10 nanometers. In particular embodiments, filtering the protein base with a nanofiltration or reverse osmosis membrane includes filtering the protein base until the protein base comprises at least 10%, more preferably 25% protein concentration by weight in certain embodiments, filtering the protein base also includes recovering at least 50% by weight of prebiotic oligosaccharides from a waste stream from the one or more membrane filters. For example, NF may be used to recover the majority of prebiotic pea oligosaccharides, including raffinose, stachyose, and verbascode, from a UF waste stream. The prebiotic oligosaccharides may be used as a healthy ingredient for food products, such as plant-based yogurt products.

In some embodiments, filtering the protein base with a nanofiltration or reverse osmosis membrane includes filtering the protein base until the protein base comprises at least 15% protein concentration, by weight. Filtration through a nanofiltration membrane or a reverse osmosis membrane may occur after filtration through one or more of an ultrafiltration membrane and microfiltration membrane. In certain embodiments, filtration through a nanofiltration membrane or a reverse osmosis membrane may be a final filtration providing a final protein concentration and moisture content of the protein base before producing the protein ingredient.

In certain embodiments, the protein base is filtered through a microfiltration membrane having a maximum pore diameter between 0.1 and 0.22 microns. As discussed earlier, filtering through a microfiltration membrane may be optional in order to change the protein composition of the protein base for particular applications. For example, types of protein having higher containing amino acids and denaturation temperature may be desirable for making higher protein milk or other food products. As another example, types of protein. having higher function protein concentrations may be more easily gelatinized for particular protein applications, e.g., such as an added protein for a yogurt product.

Certain materials may be more effective in filtering various components from the protein base, In certain embodiments, the protein base may be filtered through membrane filters including spiral wound poly ether sulfone got non-dairy protein products.

In certain embodiments, filtering the protein base also includes recovering at least 50% by weight of prebiotic oligosaccharides from a waste stream from the one or more membrane filters. For example, NF may be used to recover 50% of prebiotic pea oligosaccharides including raffinose, stachyose, and verbascode from a UF waste stream. The prebiotic oligosaccharides may be used as a healthy ingredient for food products, such as plant based yogurt products.

At step 308, the protein base may be processed to form a protein ingredient. Further separation or filtration may be used to further remove non-protein components of the protein base and increase the protein concentration and reduce the moisture content. In particular embodiments, the protein base is processed by drying the protein base. Drying may include any suitable techniques for decreasing the moisture content of a solution or slurry, In certain embodiments, the protein base is spray dried in order to form the protein ingredient. Drying the protein base may produce a concentrated protein product that is easily transported.

In particular embodiments, method 300 may further include processing the fibrous material to produce a dietary fiber. In certain embodiments, processing the fibrous material includes converting gelatinized starch into resistant starch. As discussed above, the resistant starch may be a dietary fiber, which may be utilized in other food products. In certain embodiments, processing the separated fibrous material includes heating the separated fibrous material above its starch gelatinization temperature and cooling the separated fibrous material to at least 4 degrees Celsius for a duration of 24 hours or more, in this manner, the retrogradation of the fibrous material starches may be enhanced, increasing its dietary fiber content. Any of the techniques used by certain embodiments of converter 150 in system 100 or refrigerated warehouse 250 may be used in method 300 to process the fibrous material. Furthermore, any suitable techniques known to persons having skill in the art may be used to increase the retrogradation of the fibrous material in order to produce a dietary fiber.

In certain embodiments, the dietary fiber, including converted resistant starch, from the fibrous material may be used to produce a puffed food product. A puffed food product may be produced using an extrusion process. Due to the high starch content and the starch's properties, converted fibrous material may be easily processed by twin screw or single screw extruder to produce puffed snack foods with different shapes such as pea, oat, or popcorn shape using corresponding dies. For example, extruder 290 may be used to produce an extruded product using the converted dietary fiber. In this manner, the converted fibrous material may be used in additional food products, thereby reducing waste during protein ingredient production.

The resulting dietary fiber may also be used to produce a fermented food product. A variety of indigenous fermented foods exist today, however, tempeh has been one of the most widely accepted and researched mold-modified fermented products. Traditionally, tempeh is a fermented food made from soaked and cooked soybeans inoculated with a mold, usually of the genus *Rhizopus*. Probiotics found in tempeh provide rich nutritional benefits. Bacteria may grow to viable populations of $10^8$-$10^9$ cfu/g during the fermentation with the fungus, including *Rhizopus oligosporus, Bacillus pumilus* and *B. brevis*. Species of *Streptococcus faecium, Lactobacillus casei, Klebsiella pneumoniae* and *Enterobacter cloacae* may also contribute to the fermentation. The important function of the mold in the fermentation process is the synthesis of enzymes, which hydrolyze soybean components and contribute to the development of a desirable texture, flavor, and aroma of the product. Natto is another fermented food product that is made of cooked soybeans with natto yeasts growing on the surface, producing very unique sticky paste and special flavor. Natto is a similarly fermented food with probiotics.

Tempe and natto may be produced in a variety of ways known to persons having skill in the art. In certain embodiments, tempe and natto are produced under stationary bed conditions in small units (e.g., 100 grams to 500 grams) in flexible plastic bags, tubings, or hard plastic boxes. These containers may facilitate temperature control and enhance the portability and shelf life of the resulting fermented food product. In one example, the fibrous material, e.g., the okara, may be inoculated with *R. oligosporus*, which germinates and develops mycelium using the okara as a substrate. Due to the oxygen consumption by the mold, the oxygen levels surrounding the food product decrease during the active states of fermentation and carbon dioxide levels increase. In certain embodiments, a thin layer of fibrous material or okara is used to produce the tempe or natto. By providing a thin bed of the substrate, the mycelium may more easily penetrate the substrate and levels of oxygen and carbon dioxide are more easily maintained. In certain embodiments, the fermentation occurs using a storage room configured to ventilate the area storing the fermenting food products to remove heat released by metabolic activity and ammonia produced by the degradation of the nitrogenous compounds.

In certain embodiments, the dietary fiber, including the converted resistant starch, from the fibrous material may be used to produce a fermented food product. The chemical composition of the fibrous material separated from the protein base may provide a suitable substrate for the production of fermented food products. Converting the gelatinized starch to resistant starch may enhance the chemical composition of the fibrous material for fermentation by different bacteria. While certain fermented food products, such as tempeh and natto have been discussed, any fermented food product using dietary fiber is also contemplated.

The systems and methods discussed above may be used to develop a concentrated liquid plant-based protein base that is clean-tasting, decolorized, and plant-source agnostic (e.g., the protein can be sourced from any suitable legume(s), nut(s), seed(s), grain(s), other plant-based sources, or combinations thereof). The protein base may be used as an ingredient in a high protein food product, such as a plant-based beverage (e.g., soy milk, almond milk, coconut milk, smoothie, nutritional beverage, etc.), cheese (including dairy-free cheese), yogurt (including Greek yogurt), and so on.

FIG. 4 is a flowchart diagram illustrating an example method 400 of filtering a protein base, according to certain embodiments. In certain embodiments, method 400 may be substeps performed in step 306 of filtering the protein base. In certain embodiments method 400 may be performed by Filtration Unit 130 of system 100 and/or Membrane Filtration Apparatus 270 of system 200. Method 400 may be performed by one or more elements or components of system 100 or system 200 individually or in combination with one or more additional components.

Method 400 may begin with step 402. At step 402, a protein liquid stream may be filtered using Microfiltration (MF). As a specific example, filtration may proceed by first filtering the protein liquid stream through a microfiltration membrane having a pore diameter 0.1-0.22, preferably ≥0.4 microns, at a temperature in the range of 4 to 48 degrees Celsius, or alternatively 40 to 80° F., preferably at a flow rate of 30-45 gpm. As a result, the retentate may comprise retrograde starch that may be filtered out of the liquid protein stream.

The permeate liquid protein stream may move from MF to Ultrafiltration (UF) in step 404. For example, the liquid stream may be filtered through an ultrafiltration membrane having a molecular weight cut off (MWCO), preferably 5-70 kDa, at a temperature in the range of 4 to 48 degrees Celsius, or alternatively 40 to 120° F., and preferably at a pressure/flow rate of 30-45 gpm. The permeate comprising simple compounds may be separated from the protein stream.

The protein stream may be then be filtered through a nanofiltration membrane in step 406. For example, the NF membrane may have a MWCO of 200 Da to 800 Da and may filter the protein stream at a temperature in the range of 4 to 48 degrees Celsius, preferably at a flow rate of 30-50 gpm. In this manner, particular configurations of the order of filtration techniques may optimize the production of the protein ingredient. Optionally, method 400 may further include passing the retentate of NF through reverse osmosis in step 406. Reverse osmosis may be used to further concentrate the protein content of the liquid stream by removing additional water. For example, the reverse osmosis membrane may have a MWCO of 100 Da and may filter the protein stream at a 4 to 48 degrees Celsius, preferably at a flow rate of 30-50 gpm. In some embodiments, the reverse osmosis filtration may occur at low temperature. As a result of method 400, a concentrated protein product may be produced.

In certain embodiments of method 400, the temperature range for one or more of the filtration steps may be a cold temperature range or a high temperature range. For example, one or more of the filtration steps may occur at a temperature from 4 to 10 degrees Celsius. The colder temperature may prevent growth of microbes in the protein stream or within the filtration apparatuses and may produce a higher quality protein. As another example, one or more filtration steps occur at a high temperature, such as 30 to 48 degrees Celsius. The high temperature range may facilitate the filtration of particles or molecules. Each filtration step may be carried at a separate temperature or at the same temperature. The filtration steps may also be adjusted based on the protein base being filtered and the desired form of the protein ingredient. Additionally, although temperatures have been discussed in degrees Celsius, temperature ranges or settings may be used using degrees Fahrenheit. For example, the range of 4-48 degrees Celsius is approximately the range of 40 to 120 degrees Fahrenheit as shown in FIG. 4.

EXAMPLE

Producing a Protein Base with Neutral Color, Improved Texture and Flavor

Whole yellow pea with approximately 2 protein, 50% starch, 2% fat, and 3% ash was used as the starting material. The whole pea was split and dehulled using the Glenmills Inc.'s coarse grinder and dehuller. The dehulled and split yellow pea was fine ground at 90 blade setting using Urschell Comitrol Process Model 1700, 650 inch microcut to produce the right particle size raw material. Then, the fine ground pea powder/flour was mixed with cold water at a ratio of 1:10 and resulted in the starting raw pea slurry. A separator at 100 & 120 mesh was used to remove the fibrous material crude fiber and partial starch, to end up with the pre-extractor outlet slurry. The pea slurry with protein and residual starch was put in a container for starch sediment and as a feed tank for a pilot scale membrane filtration spiral skid-input MF slurry. A polyethersulfone (PES) MF membrane at 0.4-0.7 micron pore size, ~60° F. temperature, and 100-120 psi pressure was employed to remove the starch completely from the protein slurry as the outlet MF protein slurry. An iodine solution test indicated the starch level in the pea protein slurry was not detectable because the iodine solution test did not turn the color blue. The resulting protein slurry was subjected to sonication using the Hielscher unit at frequency 20 kHz, power density 50-100 Ws/ml, 2-3 bar pressure, and 100-140° F. temperature to produce the outlet sonication protein slurry. After the sonication cavitation, the yellow b* value was decreased from 24.54 to 17.13. Afterwards, the sonicated protein slurry was subjected to spiral UF with a PES 10 kDa pore size membrane at 100-122° F. temperature and 110-130 psi and reached to ~3× volume concentration factor (VCF). Table 1 shows that the yellow color (b* value) and particle size were reduced in the final UF retentate protein base. In Table 1, certain values have been underlined to point out changes in b* value, CEM protein %, Mean Particle Size, and D(90) particle size at certain points in the process.

TABLE 1

The processes to produce pea protein base from raw pea and physicochemical properties of samples at each step

| Process & Samples | L* | a* | b* | CEM Total Solids % | CEM Protein % | CEM Fat % | Mean Particle Size (μm) | D(90) Particle Size (μm) |
|---|---|---|---|---|---|---|---|---|
| 1. Starting Raw Pea Slurry | 81.09 | 1.73 | 31.58 | 5.84 | 3.55 | 0.03 | 117.0 | 301.0 |
| 2. Pre-Extractor Outlet Slurry | 77.25 | 0.70 | 25.33 | 4.02 | 1.05 | 0.01 | 65.6 | 146 |
| 3. Inlet MF Slurry after starch sediment | 75.67 | 0.68 | 27.00 | 2.85 | 1.63 | 0.04 | 57.9 | 205 |
| 4. Outlet MF Protein Slurry | 76.52 | −0.22 | 24.54 | 2.35 | 1.55 | 0.06 | 85.8 | 225 |
| 5. Outlet Sonication Protein Slurry | 69.25 | −3.28 | 17.13 | 2.55 | 1.64 | 0.04 | nd | nd |
| 6. ~3× CF UF Retentate Protein Base | 79.83 | 3.27 | 25.88 | 6.11 | 4.62 | 0.14 | 6.4 | 9.5 |

The selected volatile compounds in the raw pea slurry and pea protein base after sonication and UF are listed in Table 2. The volatiles compounds causing off-flavor such as hexanal attributing to beany off-flavor were reduced after sonication and UF processes. In Table 2, certain values have been underlined to point out the increase in protein content in the sonication+UF sample as compared to the control sample.

TABLE 2

Selected Volatile Compounds (ppb) before and after Sonication + UF

| Volatile Compounds | Pea Protein Slurry Control | Pea Protein Base (Sonication + UF) |
|---|---|---|
| Protein Content (%) | 1.55% | 4.62% |
| Sulfur Compounds | | |
| DMS | 0.215 a | 0.163 a |
| DMTS | 0.063 b | 0.083 ab |
| Methional | 0.072 a | 0.073 a |
| Aldehydes | | |
| Acetaldehyde | 108.654 a | 74.200 b |
| Butanal | 0.798 b | 5.378 a |
| Pentanal | 0.956 a | ND |
| Hexanal | 3.121 a | 0.138 b |
| Heptanal | 5.286 a | 8.713 a |
| Octanal | 0.300 a | 0.159 b |

TABLE 2-continued

Selected Volatile Compounds (ppb) before and after Sonication + UF

| Volatile Compounds | Pea Protein Slurry Control | Pea Protein Base (Sonication + UF) |
|---|---|---|
| Nonanal | 0.287 a | 0.033 a |
| Benzaldeyhde | 0.062 b | 0.926 a |
| 2-methyl butanal | 0.679 ab | 1.392 a |
| 3-methyl butanal | 0.071 a | 0.090 a |
| 2-nonenal | 0.809 b | 0.386 a |
| 3-nonenal | 0.280 a | 0.424 a |
| E-2-heptenal | 2.544 a | 3.071 a |
| Z-4-heptenal | 53.792 a | 62.236 a |
| E-2-octenal | 0.184 b | 0.209 b |
| E-2-decenal | 1.576 a | 0.100 b |
| E-2-dodecenal | 0.120 b | 0.225 ab |
| E,Z-2,6-nonadienal | 0.505 a | 0.184 b |
| E,E-2,4-decadienal | 0.102 a | 0.076 a |
| Alcohols | | |
| 3-methyl-1-butanol | 0.318 a | 0.044 b |
| 1-Butanol | 0.280 a | 0.043 b |
| 1-Hexenol | 19.146 a | 0.277 b |
| 1-Butanol | 0.280 a | 0.043 b |
| 1-Pentanol | 0.125 a | ND |
| 1-Heptanol | 0.333 b | 0.646 ab |
| 1-octen-3-ol | 0.232 b | 0.256 b |
| Ketones | | |
| Diacetyl | 0.156 a | 0.153 a |
| Acetoin | 0.010 a | 0.090 a |
| Acetone | 1.905 a | 0.601 b |
| 2-Butanone | 0.328 b | 0.619 a |
| 2-Hexanone | 0.226 a | 0.049 b |
| 2-Heptanone | 3.016 a | 0.154 b |
| 4-Octanone | 0.624 a | 0.616 a |
| 2-Nonanone | 0.199 a | 0.189 a |
| 2-Decanone | 3.411 b | 1.614 a |
| 1-octen-3-one | 0.297 b | 0.250 b |

Figure 5:
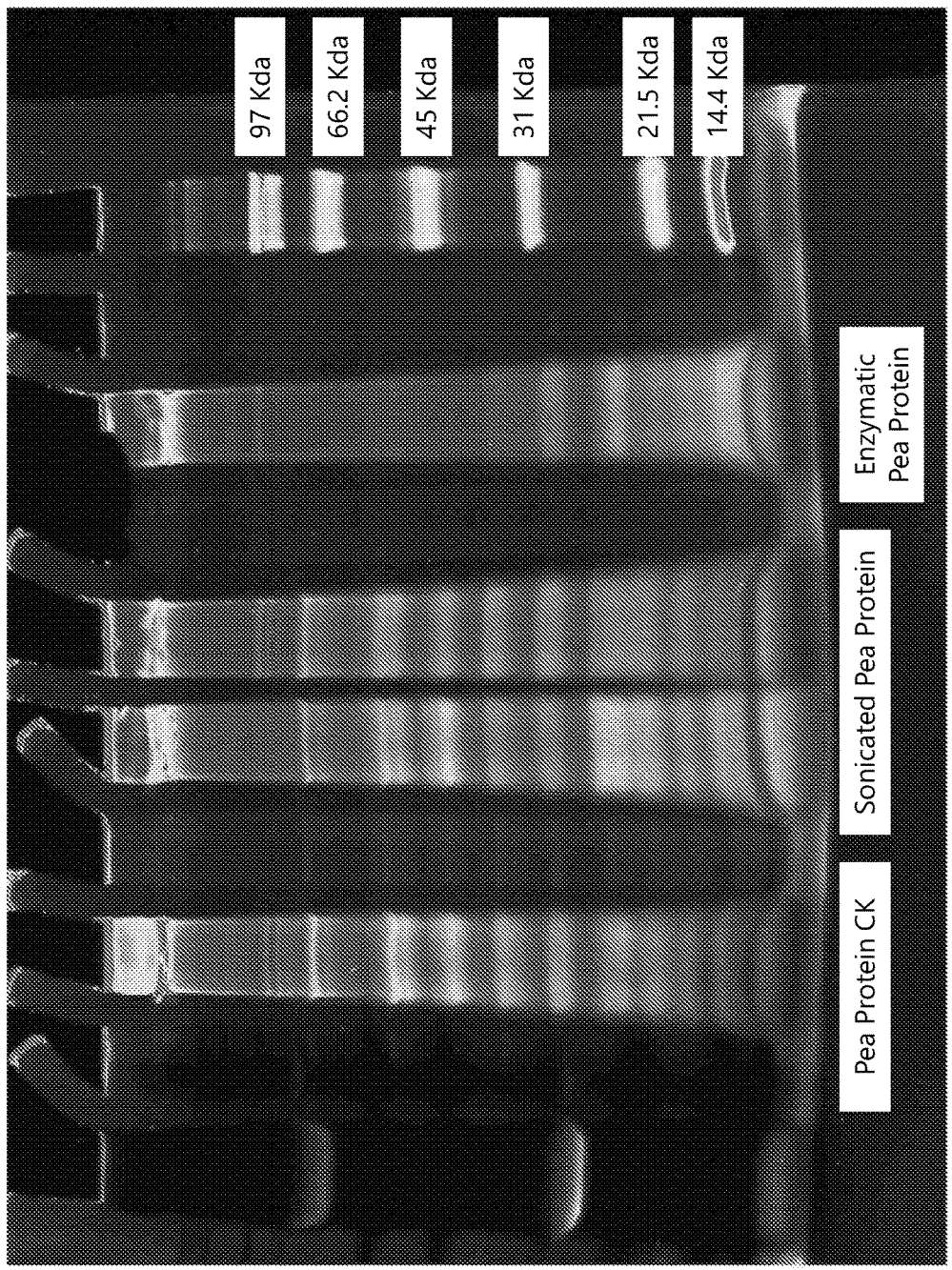
FIG. 5 is an SDS-PAGE protein analysis of a concentrated protein base prepared according to the present invention.
Figure 6:
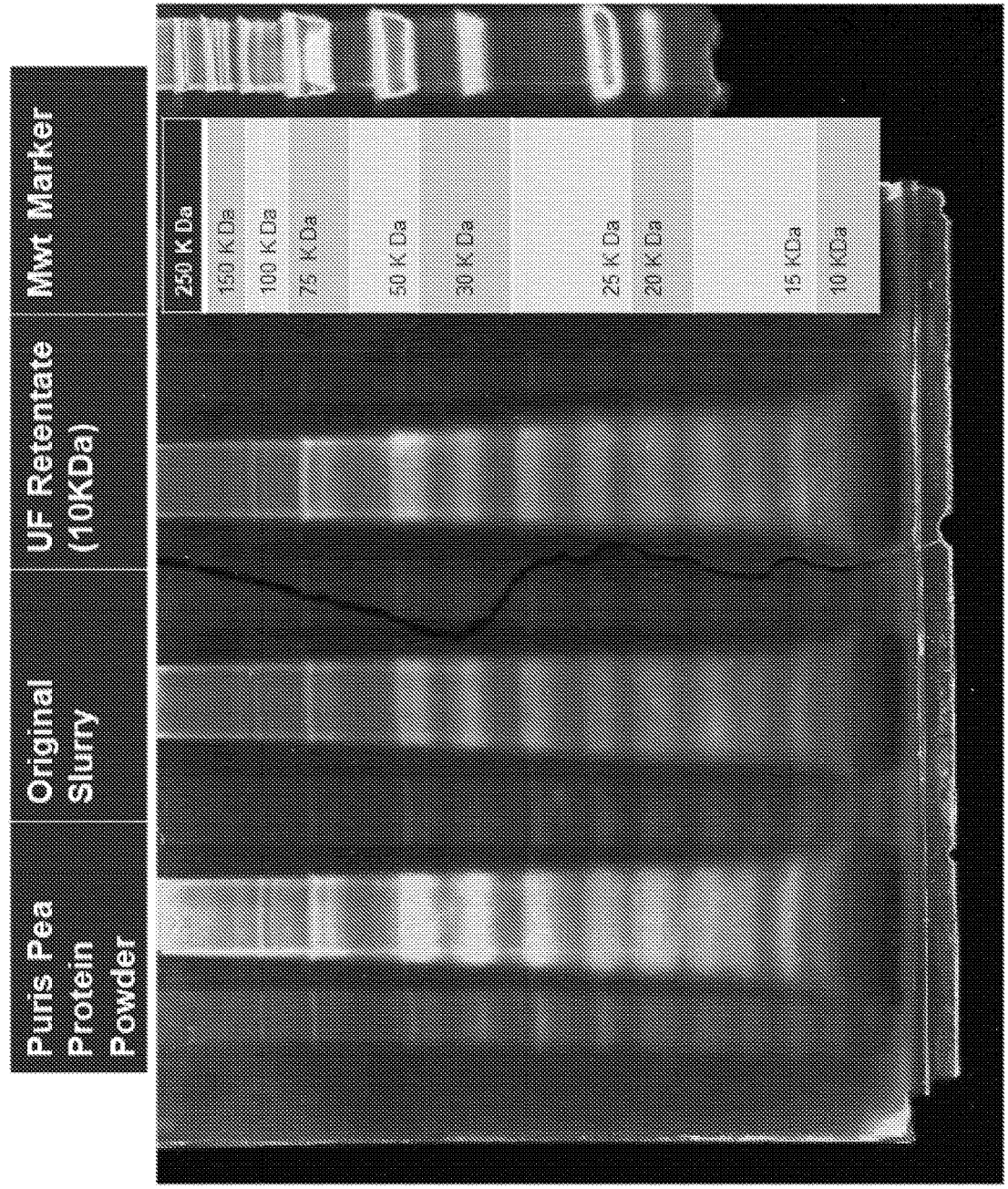
FIG. 6 is an SDS PAGE protein analysis of a concentrated protein base prepared according to the present invention before and after filtration.

FIGS. 5 and 6 show the SDS PAGE pea protein profile for the effect of sonication and UP concentration. In particular, FIG. 5 shows the SDS-PAGE Pea Protein Profile Comparison enzymatic breakdown, with sonication and without sonication, and FIG. 6 shows SDS-PAGE Pea Protein Profile Comparison before and after UF. SDS-PAGE pea protein profiles before and after sonication and using enzymatic breakdown peptide as reference in Graph 1 indicated that the sonication condition did not break obvious primary protein structure. After comparing the SDS-PAGE pea protein profiles in FIG. 6, it is indicated that UF at 10 kDa pore size recovered major protein fractions.

Certain embodiments may be more environmentally friendly than known-protein treatment techniques that require the use of chemicals. For example, alkali solution is conventionally used as an extraction solution to improve extractability and assist in lipoxygenase inactivation of plant proteins, and the isoelectric precipitation (IEP) concentration process involves acid and alkaline chemicals. Certain embodiments may allow for extracting and concentrating the protein as well as inactivating LOX without requiring the use of chemicals. Furthermore, certain embodiments may reduce waste by utilizing co-products of the protein ingredient production in order to produce dietary fiber and/or food products high in dietary fiber.

Although the present disclosure has been described with several embodiments, numerous changes, variations, alterations, transformations, and modifications may be suggested to one skilled in the art, and it is intended that the present disclosure encompass such changes, variations, alterations, transformations, and modifications as fall within the scope of the appended claims. The components of the systems and apparatuses disclosed herein may be integrated or separated. Moreover, the operations of the systems and apparatuses may be performed by more, fewer, or other components. The methods may include more, fewer, or other steps. Additionally, steps may be performed in any suitable order.

The invention claimed is:

1. A method, comprising:
    separating fibrous material from a protein base, wherein the protein base is a pea protein base;
    applying settings to an ultrasonicator to operate at a predetermined amplitude, a predetermined frequency, a predetermined power, and a predetermined duration based on a type of the protein base;
    applying ultrasonication to the protein base using the ultrasonicator according to the settings, wherein the ultrasonicator causes acoustic cavitation within the protein base; and
    filtering the protein base through one or more membrane filters to provide a concentrated protein base after separating the fibrous material from the protein base.

2. The method of claim 1, wherein the one or more membrane filters comprises an ultrafiltration membrane having a maximum pore diameter between 0.1 and 0.001 microns.

3. The method of claim 2, wherein filtering the protein base with the ultrafiltration membrane comprises filtering the protein base until the protein base comprises less than 0.5g/kg of saponins, less than 0.5% tannins, and less than 1.5g/kg phytate.

4. The method of claim 1, wherein the one or more membrane filters comprises a nanofiltration membrane or reverse osmosis membrane having a maximum pore diameter between 1 and 10 nanometers.

5. The method of claim 4, wherein filtering the protein base with the nanofiltration membrane or the reverse osmosis membrane comprises filtering the protein base until the protein base comprises a concentration of at least 15% by weight protein.

6. The method of claim 1, wherein the one or more membrane filters comprises a microfiltration membrane having a maximum pore diameter between 0.1 and 0.22 microns.

7. The method of claims 1, wherein filtering the protein base enriches vicilin protein fractions.

8. The method of claim 1, wherein the protein base is an aqueous suspension or slurry comprising a non-animal protein source.

9. The method of claim 1, wherein the protein base does not contain or is substantially free from animal and/or dairy matter.

10. The method of claim 1, wherein the predetermined amplitude is between 25 and 100 micrometers, the predetermined frequency is 20,000 Hz, the power is in a range from 100 to 400 W, and the predetermined duration is 15 minutes or longer.

11. The method of claim 1, wherein the ultrasonication is applied at least until the protein base has a color reference level with a b* value less than +15.

12. The method of claim 1, wherein the protein base comprises lipoxygenase that is activated and the ultrasonication is applied at least until the lipoxygenase is inactivated at temperatures below 85 degrees Celsius.

13. The method of claim 1, wherein the applied ultrasonication is a manosonication applied at a pressure between 1 and 4 bars.

14. The method of claim 1, wherein filtering the protein base comprises recovering at least 50% of prebiotic oligosaccharides from permeate from an ultrafiltration membrane and retentate from a nanofiltration membrane, wherein the one or more membrane filters comprises the ultrafiltration membrane and the nanofiltration membrane.

15. The method of claim 1, further comprising processing the fibrous material to produce a dietary fiber comprising converting gelatinized starch from the fibrous material into resistant starch.

16. The method of claim 15, wherein processing the separated fibrous material comprises heating the separated fibrous material above a starch gelatinization temperature and storing the separated fibrous material at or below 4 degrees Celsius for at least 24 hours.

17. The method of claim 1, wherein filtering the protein base through one or more membrane filters comprises:
    filtering the protein base through a microfiltration membrane having a maximum pore diameter between 0.1 and 0.77 microns at a pressure in a range of 15-150 pounds per square inch (psi);
    after filtering the protein base through the microfiltration membrane, filtering the protein base through an ultrafiltration membrane having molecular weight cut-off (MWCO) between 5 and 70,000 Daltons at a temperature in a range of 4 to 48 degrees Celsius and at a pressure in a range of 30 to 150 psi; and
    after filtering the protein base through the ultrafiltration membrane, filtering the protein base through a nanofiltration membrane or a reverse osmosis membrane having a MWCO between 100 and 200 Daltons at a temperature in the range of 4 to 48 degrees Celsius at a pressure in a range of 150 to 500 psi.

18. A method according to claim 1 comprising processing the protein base to form a protein ingredient.

* * * * *